United States Patent [19]
Abu-Khater et al.

[11] Patent Number: 5,732,008
[45] Date of Patent: Mar. 24, 1998

[54] LOW-POWER HIGH PERFORMANCE ADDER

[75] Inventors: Issam S. Abu-Khater, Lake Oswego, Oreg.; A. Bellaouar; Mohamed I. Elmasry, both of Waterloo, Canada

[73] Assignee: The University of Waterloo, Ontario, Canada

[21] Appl. No.: 566,962

[22] Filed: Dec. 4, 1995

[51] Int. Cl.$^6$ .................................................. G06F 7/50
[52] U.S. Cl. ........................................................ 364/788
[58] Field of Search .................................................. 364/788

[56] References Cited

U.S. PATENT DOCUMENTS

| | | | |
|---|---|---|---|
| 5,136,539 | 8/1992 | Kumar | 364/788 |
| 5,272,662 | 12/1993 | Seriber et al. | 364/788 |
| 5,434,810 | 7/1995 | Goto et al. | 364/788 |
| 5,579,254 | 11/1996 | Kumar et al. | 364/788 |

OTHER PUBLICATIONS

I.S. Abu–Khater et al., "Circuit/Architecture for Low–Power High–Performance 32bit Adder", Proceedings—Fifth Great Lakes Symposium on VLSI, Mar. 16–18, 1995, pp. 74–77.
Anantha P. Chandrakasan et al., "Low–Power CMOS digital Design", IEEE Journal of Solid–State Circuits, vol. 27, No. 4, Apr. 1992, pp. 473–484.
I.S. Abu–Khater and R.H. Yan, "A 1–V Low–Power High–Performance 32–Bit Conditional Sum Adder", 1994 IEEE Symposium on Low Power Electronics, pp. 66–67.

Kazuo Yano et al., "A 3.8–ns CMOS 16×16–b Multiplier Using Complementary Pass–Transistor Logic", IEEE Journal of Solid–State Circuits, vol. 25, No. 2, Apr. 1990, pp. 388–395.
Makoto Suzuki et al., "A 1.5–ns 32–b CMOS ALU in Double Pass–Transistor Logic", IEEE Journal of Solid–State Circuits, vol. 28, No. 11, Nov. 1993, pp. 1145–1151.
Thomas K. Callaway and Earl E. Swartzlander, Jr., "Estimating the Power Consumption of CMOS Adders", pp. 210–216.
Chetana Nagendra et al., "Power–Delay Characteristics of CMOS Adders", IEEE Transactions on Very Large Scale Integration (VLSI) Systems, vol. 2, No. 3, Sep. 1994, pp. 377–381.
J. Sklansky, "Conditional–Sum Addition Logic", IRE Transactions on Electronic Computers, Jun. 1960, pp. 226–231.

*Primary Examiner*—David H. Malzahn
*Attorney, Agent, or Firm*—Staas & Halsey

[57] ABSTRACT

A low power high performance adder using a conditional sum adder (CSA) architecture and complementary pass logic (CPL) implementation. The adder comprises a plurality of blocks, each block including a conditional sum cell and an output multiplexer. Each block except the first, also comprises a block of 2:1 multiplexers intermediate the conditional sum cell and the output multiplexer. The adder according to the present invention operates with lower power consumption and at greater speed than prior art adder architectures.

7 Claims, 11 Drawing Sheets

FIG.6

LOW-POWER HIGH PERFORMANCE ADDER

FIELD OF THE INVENTION

The present invention relates in general to binary arithmetic circuits, and more particularly to a low-power high performance adder using a conditional sum adder (CSA) architecture combined with carry select (CS) and CPL-like logic.

BACKGROUND OF THE INVENTION

The scaling of CMOS channel lengths to below 0.5 μm and recent increases in chip density to the ULSI range, have raised power dissipation considerations to as high a level of importance as performance, in digital circuit design. The requirements of portability and reliability of modern day equipment have also played a major role in the emergence of low-power low-voltage digital circuit designs. The need to extend battery life, create inexpensive packaging and cooling systems, and reduce weight and size of the equipment have been the driving forces in this regard.

For example, reducing the power dissipation of arithmetic operations while keeping the performance unaffected, is an important criteria in the design of digital signal processing (DSP) circuits, for reduced instruction set computers (RISCs), microprocessors, etc.

One area of arithmetic operation in such systems which requires high-speed and low power consumption, is binary addition. Many prior art designs of 32-bit adders are known in the art. Different architectures (eg. carry look ahead (CLA), CS, Manchester) have been used in the past with different circuit styles (eg. conventional static CMOS, Transmission Gate (TG), Conditional Pass Logic (CPL), Double Pass-Transistor Logic (DPL)). Although such conventional implementations provide reasonably high speed operation and reasonably low power consumption, there is a continued need in the art for even greater speed and lower power consumption with minimized transistor sizes.

SUMMARY OF THE INVENTION

According to the present invention, a low-power high performance adder is provided which utilizes conditional sum adder (CSA) combined with carry select (CS) and is implemented using low-power complementary pass-transistor logic (CPL) circuits. A 32-bit adder implemented in 0.8 μm CMOS according to the present invention and operating in a range of 3.3 V-to-1.5 volts has been found to outperform all prior art implementations in terms of power and speed, thereby providing a viable solution for low-power, high speed and low-voltage applications.

BRIEF DESCRIPTION OF THE DRAWINGS

A detailed description of the preferred embodiment is provided herein below with reference to the following drawings in which.

DETAILED DESCRIPTION OF THE PREFERRED EMBODIMENT

According to the present invention, an n-bit adder is provided comprising n conditional sum cells for receiving and adding respective bit pairs, n−1 multiplexer blocks connected to respective ones of the conditional sum cells (except the first cell), and n+2 output multiplexers, wherein the first n output multiplexers are connected to respective ones of the multiplexer blocks, and the last two output multiplexers are connected to a multiplexer block for the last bit pair.

Figure 1A:
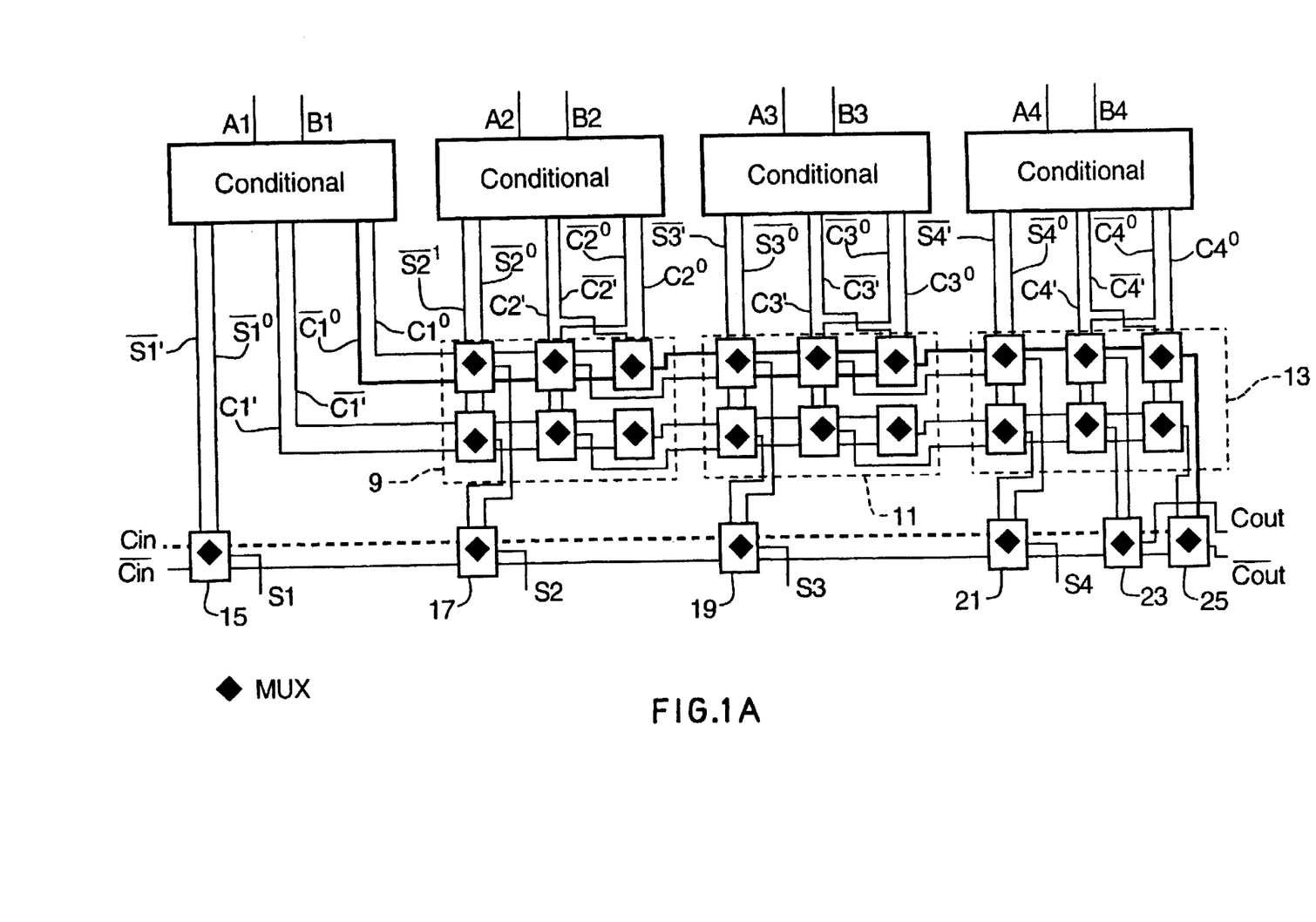
FIG. 1(a) is a 4-bit block diagram of a conditional sum adder according to the present invention.

FIG. 1(a) shows an implementation of the adder according to the present invention in which n=4. Thus, there are four conditional sum cells 1, 3, 5 and 7, three multiplexer boxes 9, 11 and 13, and six output multiplexers 15, 17, 19, 21, 23 and 25.

Figure 2:
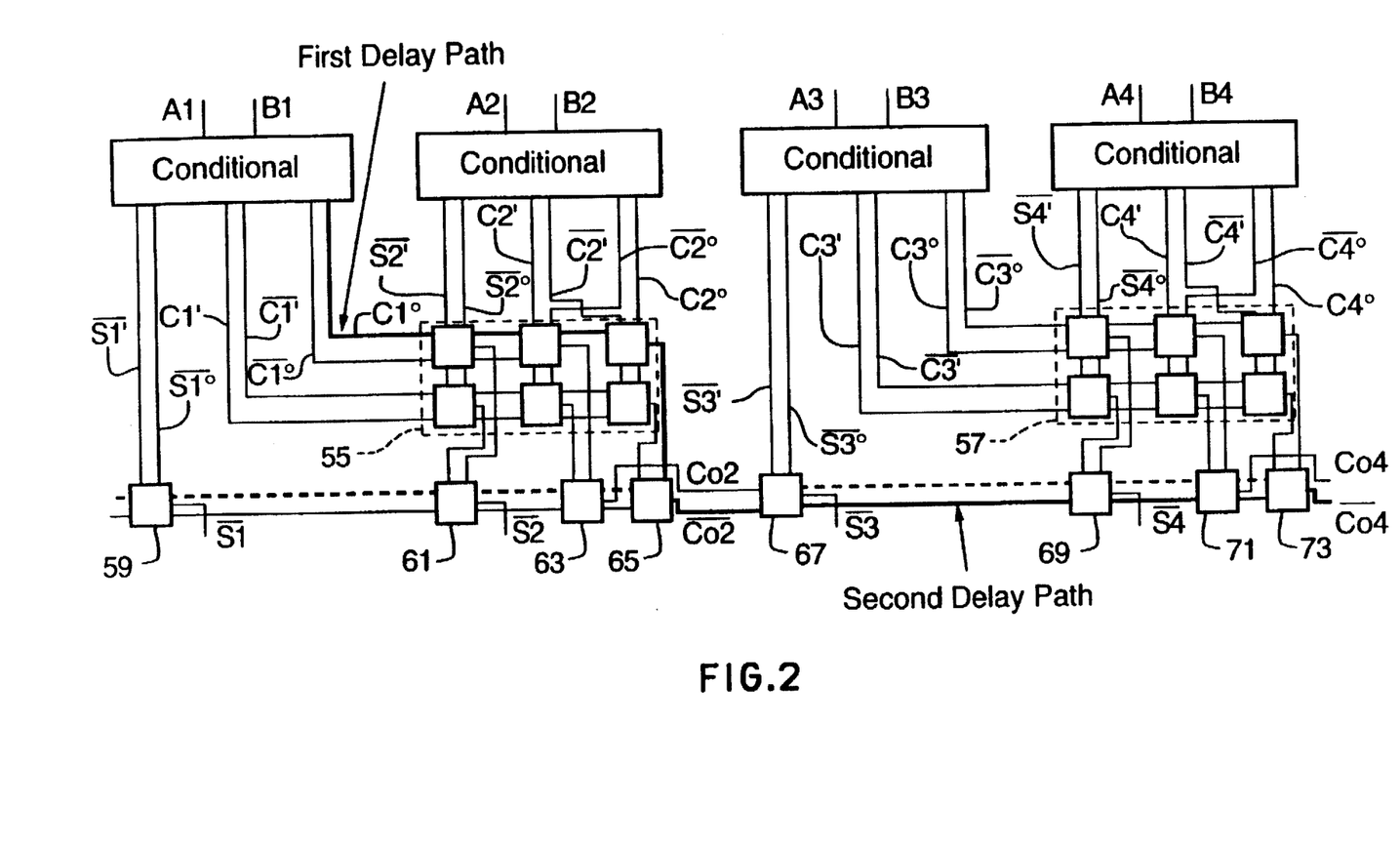
FIG. 2 shows a 4-bit adder according to the present invention, implemented using two blocks of size 2-bits each.

Turning briefly to the implementation of FIG. 2, two 2-bit adders are shown (i.e. n=2) connected in series to form a composite 4-bit adder. Thus, as will be discussed in greater detail below with reference to FIG. 4, a composite 16-bit (or 32-bit) adder may be constructed using a selection of 2-bit and 4-bit adders implemented according to the present invention, in order to optimize propagation delay.

In other words, to design an n-bit adder for fast operation, staged blocks may be connected together, each block having a variable width. In this case, all of the conditional sum blocks compute their respective double sums and double output carries in parallel. The true carry-out and sum of each block are then selected by the carry-in generated by the previous stage. Accordingly, such an architecture utilizes a carry select (CS) technique.

Figure 1B:
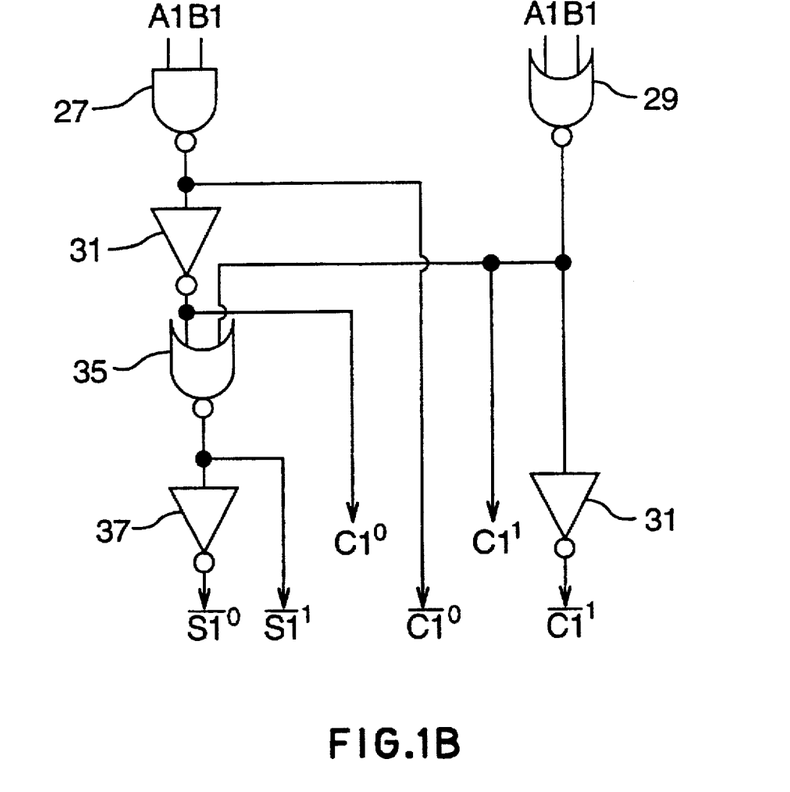
FIG. 1(b) shows a gate level implementation of each conditional sum cell of the adder shown in FIG. 1(a)

FIG. 1(b) illustrates a gate level implementation of the conditional sum cell 1. Conditional sum cells 3, 5 and 7 are constructed in an identical manner. According to a first possible implementation, the conditional cell of FIG. 1(b) can be constructed using simple static logic gates. However, as will be discussed in greater detail below, according to the present invention a CPL-like logic is used to implement the conditional sum cell.

In operation, NAND gate 27 receives bits A1 and B1 and in response generates a complementary carry-zero output ($\overline{C1^0}$). NOR gate 29 operates logically on input bits A1 and B1 to generate a carry-one output ($C1^1$).

The $\overline{C1^0}$ and $C1^1$ outputs are inverted via NOT gates 31 and 33, respectively, to generate a carry-zero output ($C1^0$) and complementary carry one output ($\overline{C1^1}$).

A second NOR gate 35 operates on $C1^0$ and $C1^1$ to generate a complementary carry-one sum output ($\overline{S1^1}$), which is then inverted via NOT gate 37 to provide a complementary carry-zero sum ($\overline{S1^0}$).

A truth table for the operation of the conditional sum cell shown in FIG. 1(b), is provided below with reference to Table 1.

TABLE 1

| A1 | B1 | $C1^0$ | $\overline{C1^0}$ | $C1^1$ | $\overline{C1^1}$ | $S1^0$ | $S1^1$ |
|----|----|--------|-------------------|--------|-------------------|--------|--------|
| 0  | 0  | 0      | 1                 | 1      | 0                 | 1      | 0      |
| 0  | 1  | 0      | 1                 | 0      | 1                 | 0      | 1      |
| 1  | 0  | 0      | 1                 | 0      | 1                 | 0      | 1      |
| 1  | 1  | 1      | 0                 | 0      | 1                 | 1      | 0      |

Figure 1C:
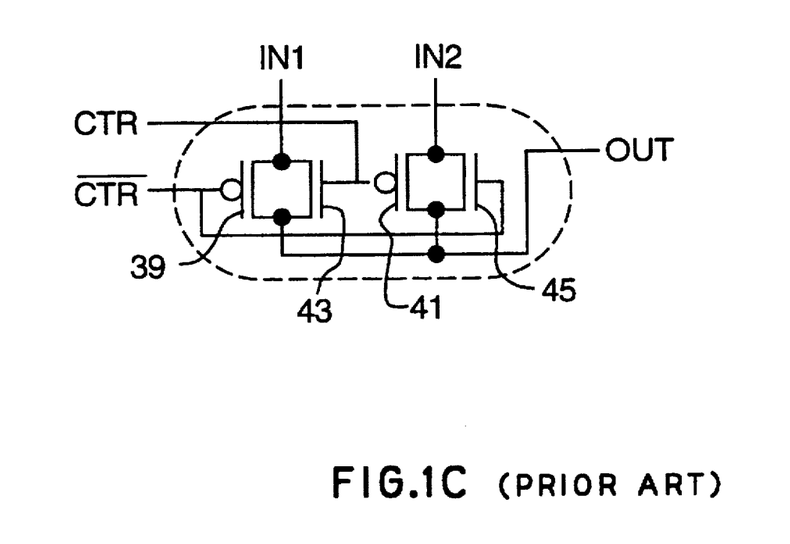
FIG. 1(c) shows a prior art transmission gate implementation of the multiplexers in the adder of FIG. 1(a)

FIG. 1(c) shows a prior art transmission gate (TG) implementation of each multiplexer of the multiplexer blocks 9, 11 and 13, as well as the output multiplexers 15, 17, 19, 21, 23 and 25. The multiplexer of FIG. 1(c) comprises a pair of PMOS transistors 39 and 41 having source and drain terminals thereof connected respectively to NMOS transistors 43 and 45. The multiplexer generates an output (OUT) which is a selected one of the inputs (IN1 or IN2) based on the logic levels of the control inputs (CTR and $\overline{CTR}$). For example, in multiplexer 15, IN1=$\overline{S1^1}$, IN2=$s1^0$, CTR=Cin, $\overline{CTR}=\overline{Cin}$ and OUT=S1.

As discussed above, high-speed operation is an important aspect of the adder according to the present invention. In the four-bit implementation of FIG. 1(a), there are two critical delay paths. The first critical delay path, $\tau_{Cin}$, is shown in dashed lines. The second critical delay path, $\tau_{B1}$, is shown in bold line.

Returning to FIG. 2, for a 4-bit adder implemented using two blocks of size 2-bits each, the $\tau_{B1}$ delay path extends from the least significant bit input (B1) to the carry out [B1→$C_{o2}$] and is composed of the carry generation delay in the conditional cell 47, the carry delay through the multiplexer block 55 and the delay of selecting the output carry ($C_{o2}$,$\overline{C_{o2}}$) to the next 2-bit block. The second delay path, $\tau_{Cin}$, is the delay from the input carry to the carry out [$C_{o2}$→$C_{o4}$], this delay being the sum of carry delays through output multiplexers 67, 69, 71 and 73. The first and second delay paths are highlighted in FIG. 2 using bold lines.

These propagation delays may be estimated for an n-bit adder using variable staging, as follows:

$$\tau_{Cin} = \tau_{MUX}\left(\frac{N}{B}\right)$$

$$\tau_{B1} = \tau_{cond} + (S_I - 1)\tau_{MUX} + \tau_{Cin}$$

Where:
N=number of bits
B=number of blocks
$S_1$=size of first block
$_{cond.}$=conditional cell delay
$\tau'_{MUX}$=inter-block delay of output MUXs
$\tau_{MUX}$=intra-block delay of MUXs within the block It will be understood from a review of equations 1 and 2, that a design of the multiplexer blocks and the number of blocks and sizes used to build a higher order n-bit adder, are crucial elements in effecting performance and power dissipation of the circuit.

Although the static transmission gate (TG) implementation of FIG. 1(c) exhibits high performance and low power consumption compared to prior art adder architectures, it suffers from the presence of large PMOS transistors 39 and 41 which occupy significant chip area and contribute to dynamic power dissipation.

According to the present invention, a CPL-like implementation is utilized which eliminates the use of PMOS transistors in the multiplexer blocks, uses NMOS transistors for reducing the voltage swing on the internal nodes by the transistor threshold voltage (Vth), which contributes to lowering the dynamic power dissipation, and eliminates the use of inverters in the conditional sum cells while still providing complementary signals required for the adder architecture.

Figure 3:
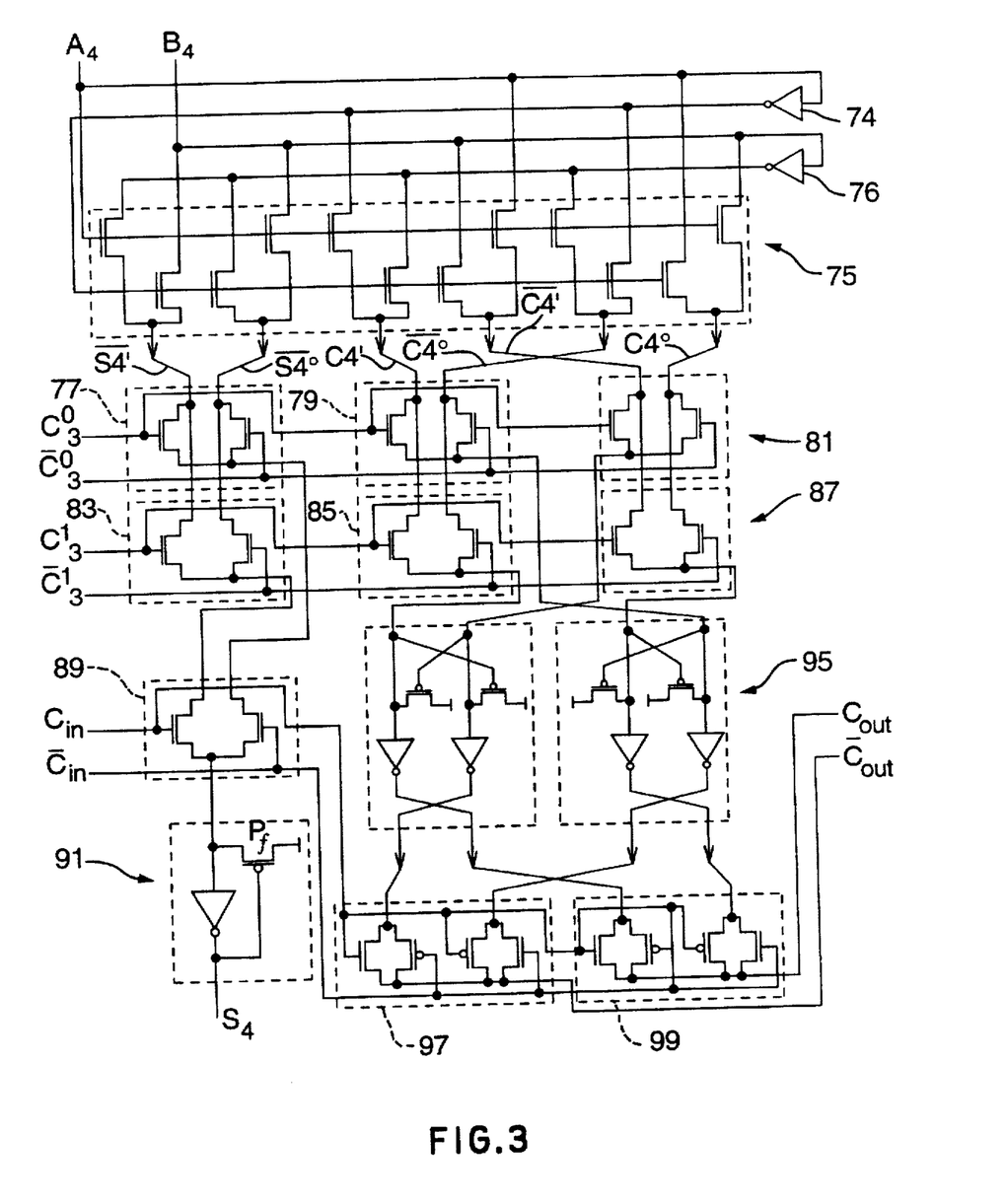
FIG. 3 is a schematic diagram showing the output stage (i.e. 4th bit) of the adders shown in FIGS. 1(a) and 2.

The transistor implementation of a single stage of the adder according to the preferred embodiment, is shown in FIG. 3. The output stage (i.e fourth-bit of the adder in FIGS. 1a and FIG. 2) was chosen for illustration because it contains all elements of the design (e.g. multiplexer blocks, output multiplexers, etc.).

The conditional sum cell 75 comprises a plurality of NMOS transistors connected to implement a CPL-like logic. The conditional circuit 75 receives bits A4 and B4 and $\overline{A4}$ and $\overline{B4}$ via inverters 74 and 76 and in response generates the double sum and carry outputs, and their complements in accordance with the truth table set out in Table 1. The generated signals have reduced voltage swing over the static gate implementation of FIG. 1(b), but with sufficient strength to drive the multiplexers 77, 79, 81, 83, 85 and 87 without the need for signal restoration. The voltage drop on the internal switching capacitance nodes of the NMOS transistors of conditional cell 75 contributes to decreased dynamic power dissipation.

The multiplexers 77, 79, 81, 83, 85 and 87 (i.e. multiplexer block 57 in FIG. 2), are implemented in NMOS pass logic, and all signals which drive the multiplexer gates are restored to full-swing voltage by the employment of a double ended restoration circuit 95. This is required to ensure that the transistors are fully turned on.

The restoration circuit 95 acts as a buffer for driving the output transmission gate multiplexers 97 and 99. By placing these buffers within the block and ahead of the output multiplexers, they do not contribute to the intra-block critical delay path and do not contribute to the overall circuit delay of the stage blocks.

The output sum selected by multiplexer 89 is restored to full-swing using a single ended restoration circuit 91. The feedback PMOS transistor $P_f$ is used to restore the output voltage level from $V_{DD}$-$V_{th}$ to full saving ($V_{DD}$), hence eliminating any DC current, to permit an easy discharge of the output node through the NMOS network, the transistor $P_f$ is designed to be a weak device (ie. with small transistor width).

Specifically, the feedback transistor $P_f$ eliminates the static power consumption in the circuit due to the reduced voltage swing provided by the CPL-like logic of the conditional cell 75.

The output multiplexers 97 and 99 which select the carry-out for driving the next block (i.e. $C_{OUT}$, $\overline{C_{OUT}}$) are designed using transmission gate logic (i.e. similar to the multiplexer shown in FIG. 1c). This is required to keep the output carry signal at full swing voltage.

One advantage of the CPL-like implementation of FIG. 3 over the prior art static gate implementation is the minimization of PMOS transistors in the circuit, and hence a reduction both of the internal node switching capacitance and the layout area used.

As discussed above, composite adders may be constructed using a plurality of series connected adder blocks of different sizes, each being characterized by different signal propagation delays. Optimization of the adder performances directly dependent on the block size and staging used to build the adder. The effect of block size and staging is illustrated in the 16-bit adder example shown in FIG. 4. The two critical path delays of the building blocks are indicated on each block, where the top and bottom numbers correspond to the two delay paths of equations 2 and 1, respectively.

Figure 4A:
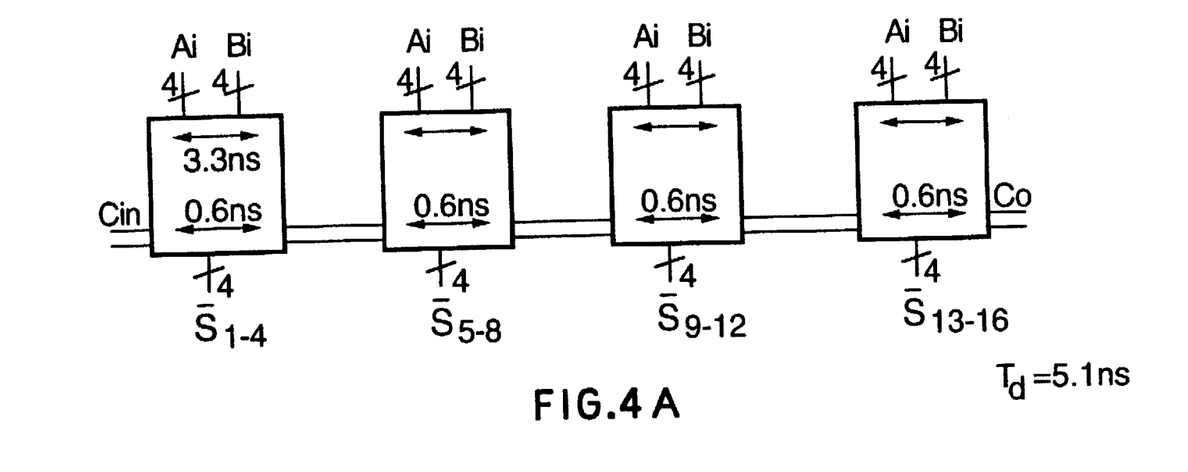
FIGS. 4(a) and 4(b) depict propagation delay for an adder implementation using 4 blocks of 4-bits each and blocks having variable sizes based on staging conditions, respectively.

As discussed above, a 16-bit adder can be built using many different staging combinations of various block sizes. According to the solution of FIG. 4(a), a first implementation using blocks of equal size (in this case four blocks of 4-bits each), is set forth. The propagation delay is computed based on the fact that all blocks are executed in parallel, so that after a 3.3 ns delay of the first block, the only remaining delay is through propagating the carry to the next block, such that the total delay can be computed as follows:

$$3.3 \text{ ns} + 3*0.6 \text{ ns} = 5.1 \text{ ns}$$

It will be noted that the fourth block (i.e. output sum bits $S_{13-16}$) will be idle for at least 1.2 ns while it awaits a carry input.

Figure 4B:
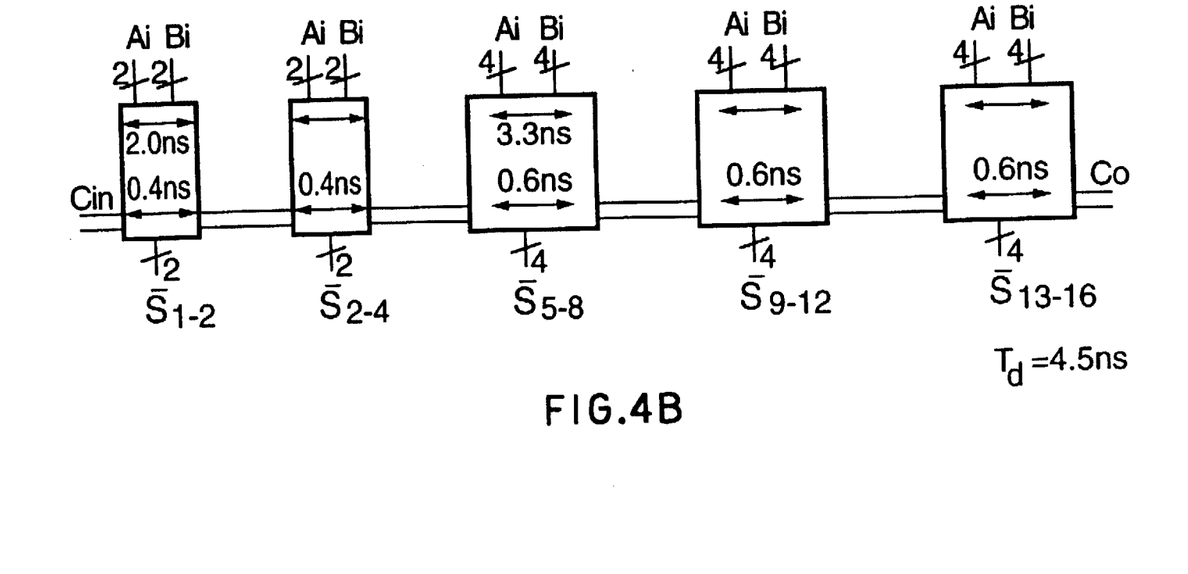
Figure 5A:
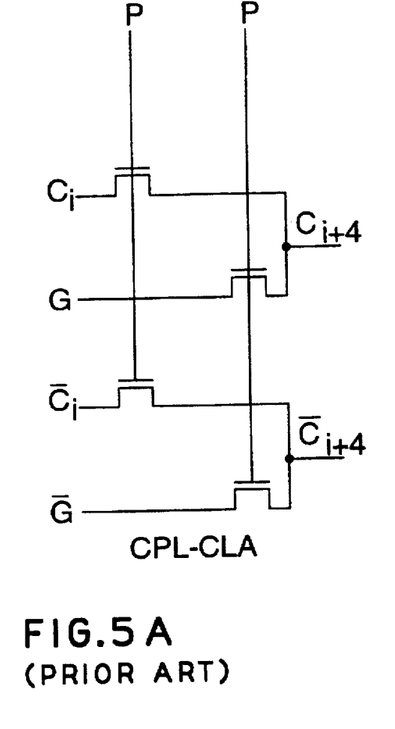
FIGS. 5(A)–5(F) shows the critical carry path circuits of various prior art adder architectures.
Figure 5B:
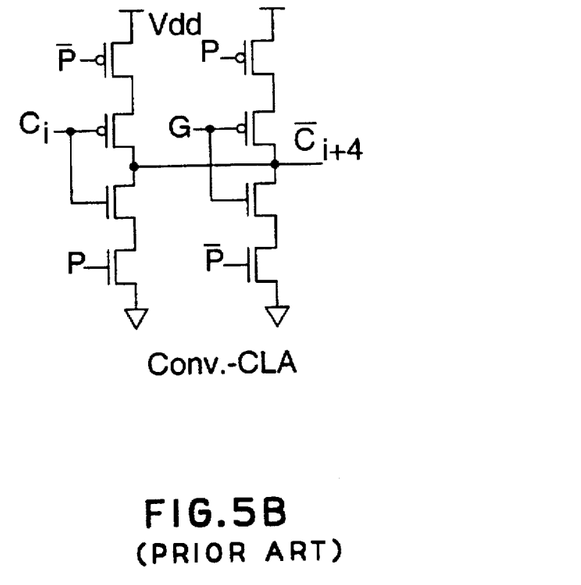
Figure 5C:
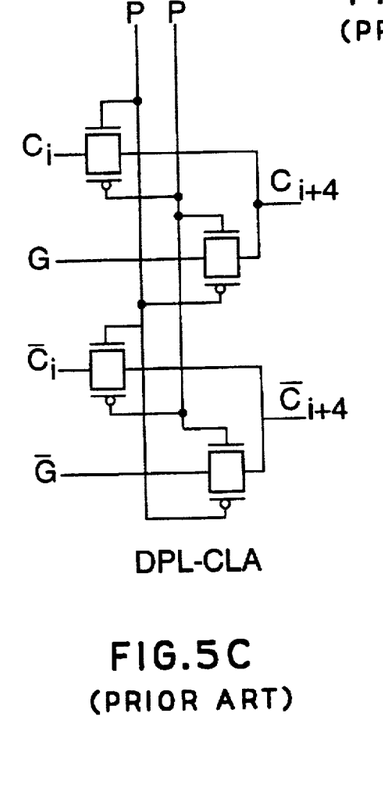
Figure 5D:
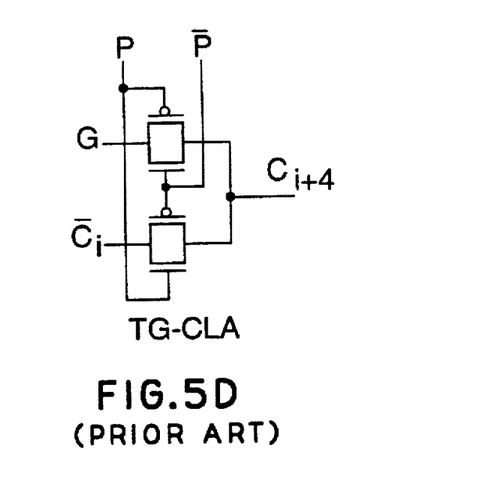
Figure 5E:
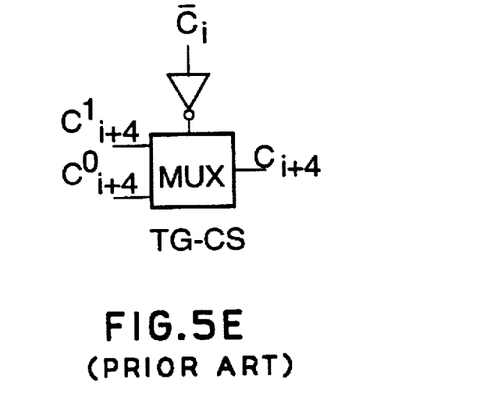
Figure 5F:
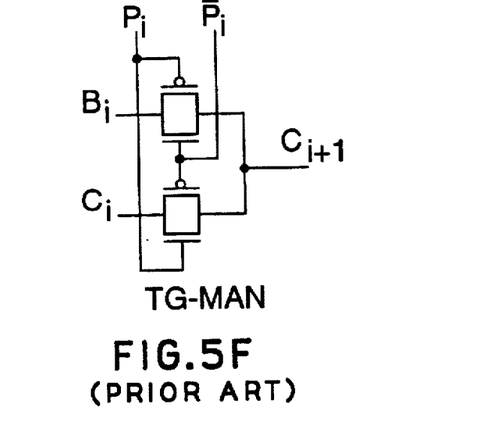

The idle time for the 16-bit adder can be reduced if the block size and staging is changed to the second implementation shown in FIG. 4(b). In this implementation, the blocks have variable sizes based on the staging condition that the block size is increased only when the next block is settled and ready for the carry-in when it arrives. In the present implementation, the optimized architecture comprises two blocks of two-bits each followed by three four-bit blocks, resulting in a total delay of 4.5 ns (i.e. 0*2.0 ns+0*0.4 ns+3.3 ns+2*0.6 ns).

For the case of a 32-bit adder, optimized performance results in a staging of seven blocks according the following bit sizes: 2-2-4-4-4-8-8. This combination is utilized for the results set forth below with reference to FIGS. 5–9.

Test Results

Since a minimum sized design leads to minimum power dissipation, the test results set forth below were based on a minimum sized transistor design for each adder architecture. The size of each PMOS transistor used was double that of each NMOS transistor. A second set of tests was then conducted with a transistor design optimized to improve performance, leading to power savings since only the critical delay paths are optimized.

In order to give accurate estimation of power dissipation, a plurality of 32-bit adders were constructed using modules of 4-bit blocks, except for the CS and CSA implementations. The CS implementation utilized a 4-4-7-9-8 staging combination of block sizes. The CSA implementation utilized a 2-2-4-4-4-8-8 staging combination of block sizes. The power dissipation of a particular adder architecture was calculated by summing the average power of each block in the circuit. The average power of a block was computed by averaging over all possible input patterns. An estimated load at the output of the module was included in the test parameters.

All adder circuits were simulated using 0.8 μm CMOS (in BiCMOS) technology, utilizing a HSPICE simulator (HSPICE version H92, Meta-Software, Inc., 1992). Table 2 lists the key technology parameters for the process used.

TABLE 2

KEY DEVICE PARAMETERS FOR 0.8 μm CMOS (in BiCMOS PROCESS)

|  | NMOS | PMOS |
|---|---|---|
| $L_G$ | 0.8 μm | 0.8 μm |
| $I_{ds}$ | 1.8 mA | 0.8 mA |
|  | @ $V_{DS} = V_{GS} = 3.3$ V, W = 10 μm | |
| $T_{ox}$ | 175Å | 175Å |
| $V_T$ | 0.80 V | −0.90 V |

The CSA-CPL architecture of the present invention has been compared to prior art CSA-TG, CLA, CS and manchester adder architectures using conventional static CMOS, TG, CPL and DPLI circuit styles. FIG. 5 shows the critical carry path circuits of the various prior art architectures used in this comparison. The various adders are named in FIGS. 6–9 to reflect the architectures and circuit styles as shown in FIG. 5. For all of the CLA adder architectures, P and G are the global generate and propagate signals and are given by:

$$P = P_{i+3}P_{i+2}P_{i+1}P_i$$

$$G = G_{i+3} + P_{i+3}G_{i+2} + P_{i+3}P_{i+2}G_{i+1} + P_{i+3}P_{i+2}P_{i+1}G_i$$

where $P_i = A_i \oplus B_i$, $G_i = A_i B_i$, $A_i$ and $B_i$ = the $i^{th}$ bits of the numbers to be added.

Figure 6:
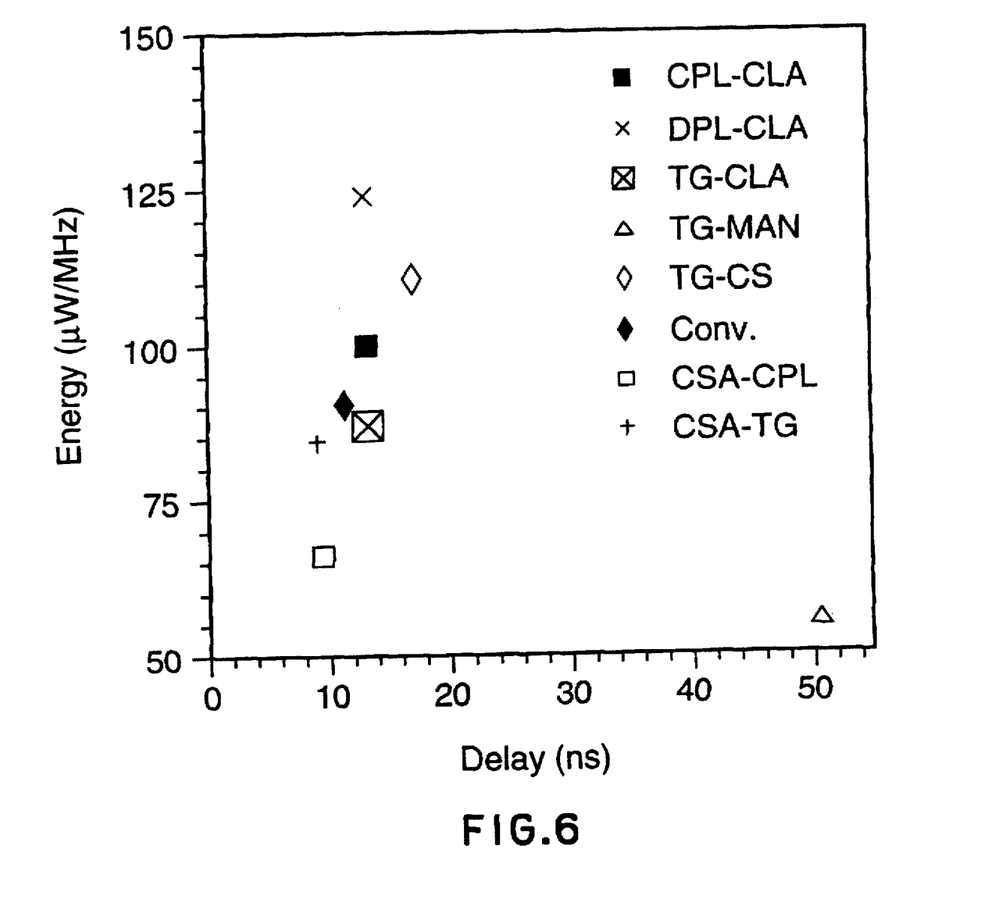
FIG. 6 shows the energy versus delay for a minimum-size 32-bit adder according to the present invention in comparison with prior art architectures.

FIG. 6 shows energy versus delay for the minimum-size 32-bit adders at 3.3 V. It can be seen that both of the CSA (i.e. CPL-like and TG) implementations of the present invention consume less energy and provide better speed performance than any other prior art architecture. The CSA-CPL implementation consumes 22% less energy at approximately the same performance when compared to the prior art CSA-TG$_4$ embodiment. In addition, the CSA-CPL implementation of the preferred embodiment does not exhibit any DC current consumption due to the use of the restoration circuits 91 and 95 and feedback PMOS transistor $P_f$. Compared to the conventional static CLA implementation, the CSA-CPL embodiment consumes 15% more energy but provides a delay reduction factor of 5.5.

Figure 7:
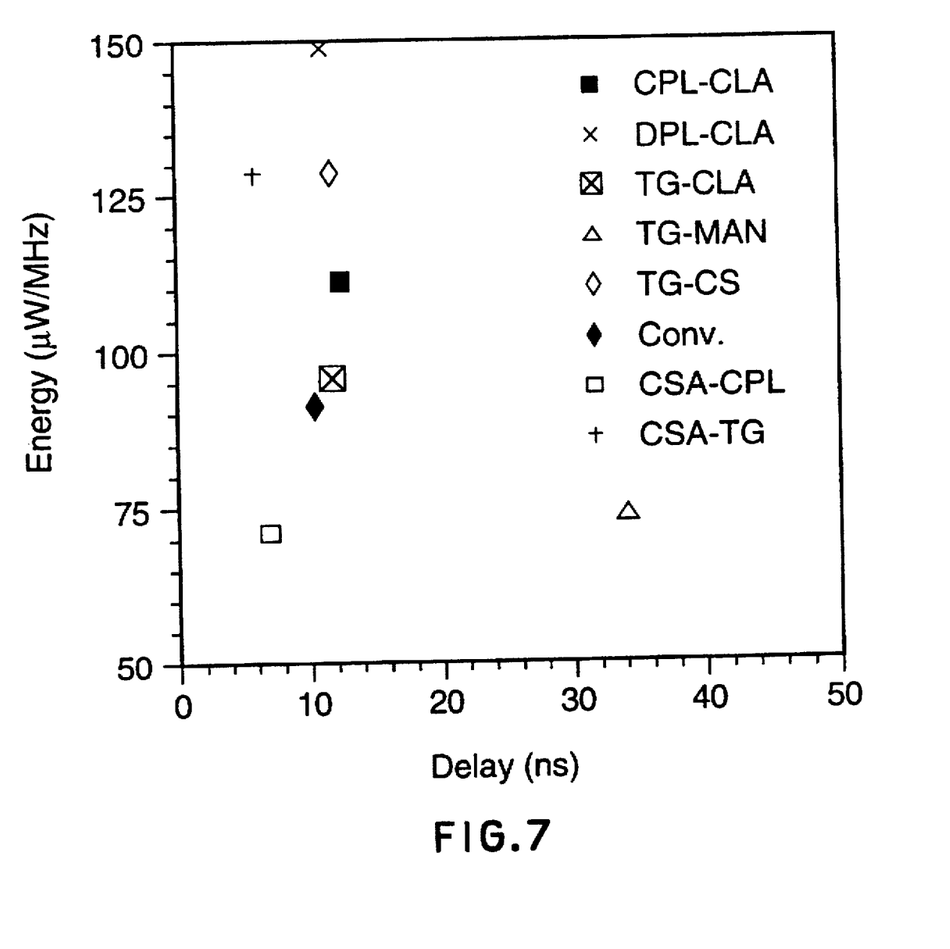
FIG. 7 shows the energy versus delay for an optimized 32-bit adder according to the present invention in comparison with prior art architectures.

FIG. 7 shows energy versus delay for the optimized 32-bit adders. Again, the CSA-CPL implementation consumes 22% less power than the conventional CLA implementation and is 34% faster. When compared to the TG-manchester adder, the CSA-CPL implementation of the preferred embodiment consumes almost the same amount of energy but it outperforms the TG-manchester in terms of speed by a factor of 5. The optimized CSA-CPL implementation of the present embodiment consumes 45% less energy than the optimized CSA-TG implementation with a speed reduction of 17%.

Figure 8:
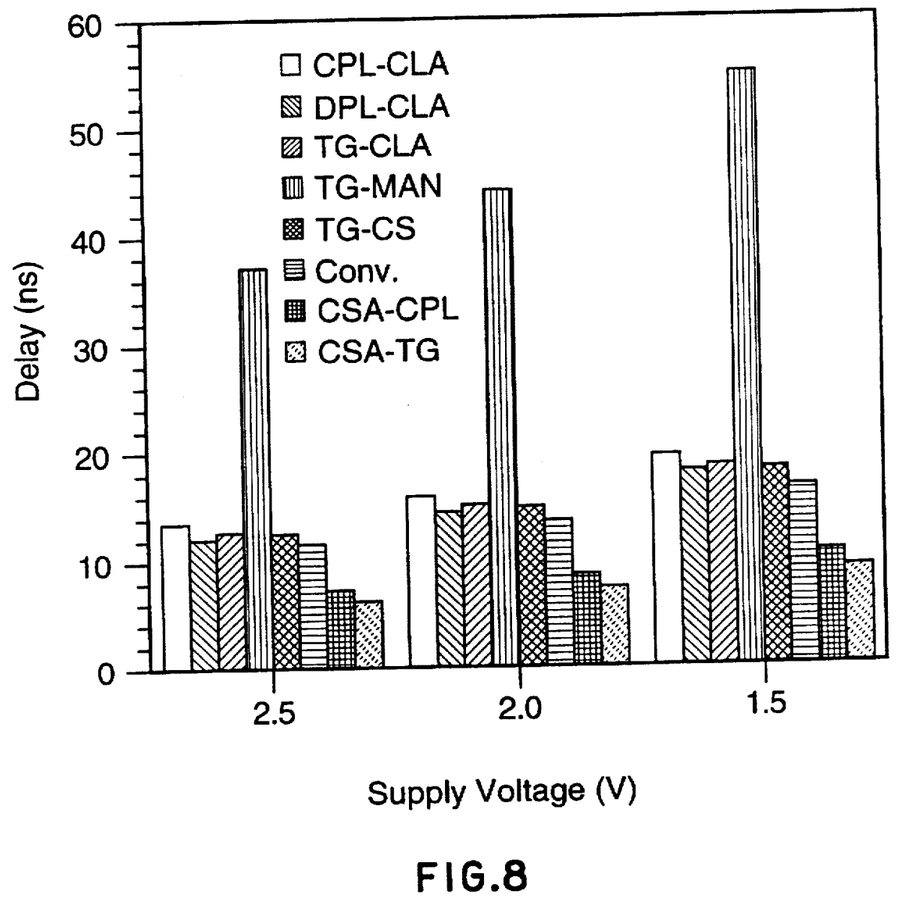
FIG. 8 shows the delay versus supply voltage scaling for an optimized adder according to the present invention in comparison with prior art architectures.

In order to study the sensitivity of the circuit performance to the scaling of supply voltage, the optimized circuits were simulated with different supply voltages. The threshold voltage was scaled with the supply using the relation, $V_{th} = 0.2 V_{DD}$. FIG. 8 shows the delay versus supply voltage scaling for the optimized adders which demonstrates that both of the CSA implementations are faster than any other implementation, down to 1.5V.

Figure 9:
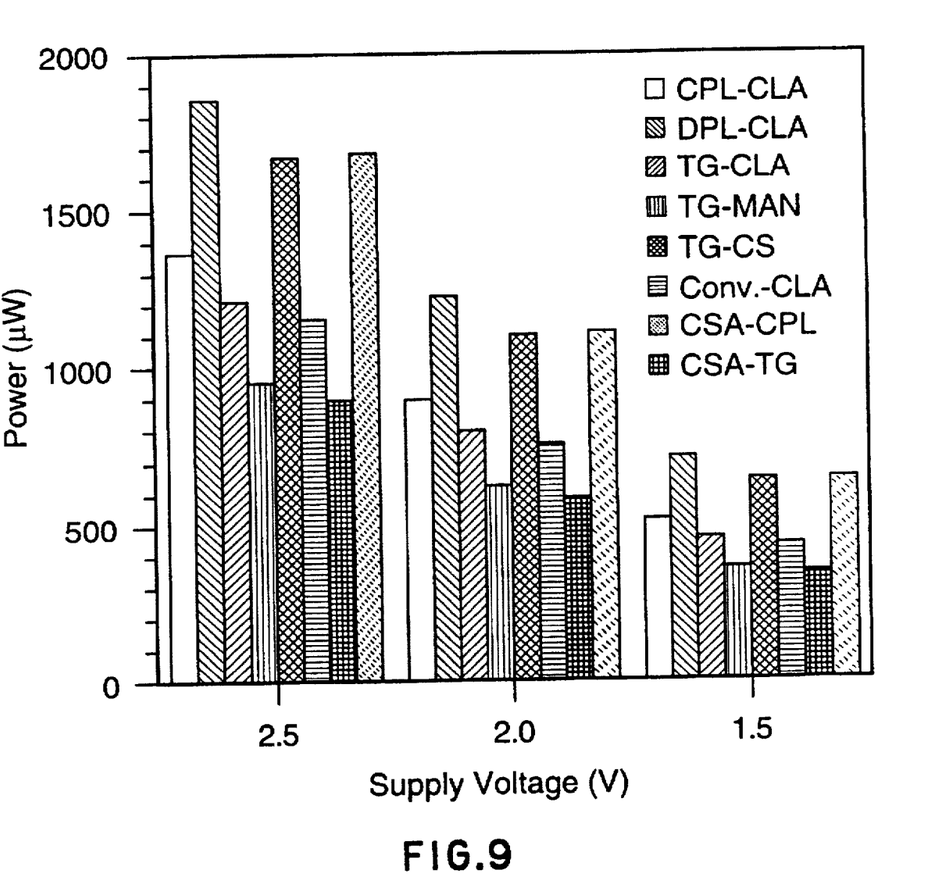
FIG. 9 shows the power dissipation versus supply voltage sealing at 20 MHz for an adder according to the present invention in comparison with prior art architectures.

FIG. 9 shows power dissipation versus supply voltage scaling at 20 Mhz. The CSA-CPL implementation of the preferred embodiment provides the lowest power dissipation, comparable to none other than the TG-manchester implementation which has low-power consumption but extremely higher propagation delay. The performance (i.e. speed) of the CSA-CPL circuit is slightly lower compared to that of the CSA-TG implementation. This is due to adding the restoration circuitry in the critical path. But the overall power-delay product is reduced by 35% using the CPL implementation. The effect of scaling the supply voltage from 3.3V to 1.5V on the CPL embodiment produces a power saving factor of 4.4 and a speed degradation factor of 1.8. This translates into a power-delay product saving factor of 2.4.

In summary, a binary adder is provided in accordance with the present invention, using a CSA architecture combined with a carry select and CPL-like circuit implementation. The new implementation outperforms other prior art implementations in terms of power and speed, resulting in power savings of more than 22% over conventional-CLA architectures and a speed increase of 34% has been achieved at 3.3V. These power and speed advantages have been sustainable down to a 1.5V power supply. When compared to prior art the CPL-CLA and DPL-CLA implementations, the CSA-CPL adder of the present invention outperforms both of them by a power saving of 36% and 52% respectively, and a speed enhancement of 44% and 38%, respectively. Therefore, it is believed that test results confirmed the above results in terms of speed and power dissipation. It is also believed that the CSA adder circuits of the present invention provide viable solutions for low-power, low voltage applications.

Alternative embodiments and modifications of the invention are possible without departing from the sphere and scope thereof as set forth in the claims appended hereto.

We claim:

1. An n-bit adder for receiving a carry input (Cin), a plurality of binary input pairs (Ai and Bi) to be added, where i=1 to n, and in response generating a sum output (Si) and carry output (Cout), comprising:

a) n conditional sum cells for receiving respective ones of said binary input pairs (Ai and Bi) to be added, and in response generating respective local sum outputs (si) and local carry outputs (ci), each of said conditional sum cells comprising:

a plurality of complementary pass-transistor logic gates;

a pair of NOT gates for receiving one of said binary input paks (Ai and Bi) to be added, and in response generating a complementary binary input pair ($\overline{Ai}$ and $\overline{Bi}$);

a first pair of complementary pass-transistors gated by Ai and $\overline{Ai}$, respectively, an input of a first one of said first pair of complementary pass-transistors for receiving $\overline{Bi}$, an input of a second one of said first pair of complementary pass-transistors for receiving Bi, and outputs of said first pair of complementary pass-transistors being connected together for outputting a complementary carry-one sum output ($\overline{si^1}$);

a second pair of complementary pass-transistors gated by $\overline{Ai}$ and Ai, respectively, an input of a first one of said second pair of complementary pass-transistors for receiving $\overline{Bi}$, an input of a second one of said second pair of complementary pass-transistors for receiving Bi, and outputs of said second pair of complementary pass-transistors being connected together for outputting a complementary carry-zero sum output ($\overline{si^0}$);

a third pair of complementary pass-transistors gated by Ai and $\overline{Ai}$, respectively, an input of a first one of said third pair of complementary pass-transistors for receiving $\overline{Ai}$, an input of a second one of said third pair of complementary pass-transistors for receiving $\overline{Bi}$, and outputs of said third pair of complementary pass-transistors being connected together for outputting a carry-one output ($ci^1$);

a fourth pair of complementary pass-transistors gated by $\overline{Ai}$ and Ai, respectively, an input of a first one of said fourth pair of complementary pass-transistors for receiving Bi, an input of a second one of said fourth pair of complementary pass-transistors for receiving Ai, and outputs of said fourth pair of complementary pass-transistors being connected together for outputting a complementary carry-one output ($\overline{ci^1}$);

a fifth pair of complementary pass-transistors gated by Ai and $\overline{Ai}$, respectively, an input of a first one of said fifth pair of complementary pass-transistors for receiving Bi, an input of a second one of said fifth pair of complementary pass-transistors for receiving $\overline{Ai}$, and outputs of said fifth pair of complementary pass-transistors being connected together for outputting a complementary carry-zero output ($\overline{ci^0}$); and a sixth pair of complementary pass-transistors gated by $\overline{Ai}$ and Ai, respectively, an input of a first one of said sixth pair of complementary pass-transistors for receiving Ai, an input of a second one of said sixth pair of complementary pass-transistors for receiving Bi, and outputs of said sixth pair of complementary pass-transistors being connected together for outputting a carry-zero output ($ci^0$);

b) n−1 multiplexer blocks for receiving said respective local sum outputs (si) and local carry outputs (c(i−1)) from respective adjacent conditional sum cells, and in response selecting predetermined ones of said local sum outputs (si) and local carry outputs (ci) for output under control of said respective local carry outputs (c(i−1)); and c) n+2 series connected output multiplexers for receiving said carry input (Cin), local sum outputs (si), local carry outputs (cn) of a last one of said n−1 multiplexer blocks and in response generating respective bits of said sum output (Si) and said carry output (Cout).

2. The adder of claim 1, wherein each of said multiplexer blocks comprises:

a first NMOS pass-transistor multiplexer for selecting one of either said complementary carry-one sum output ($\overline{si^1}$) or said complementary carry-zero sum output ($\overline{si^0}$) under control of adjacent carry-zero and complementary carry-zero outputs ($c(i-1)^0$ and $\overline{c(i-1)^0}$);

a second NMOS pass-transistor multiplexer for selecting one of either said carry-one output ($ci^1$) or said complementary carry-zero output ($\overline{ci^0}$) under control of adjacent carry-zero and complementary carry-zero outputs ($c(i-1)^0$) and $\overline{c(i-1)^0}$);

a third NMOS pass-transistor multiplexer for selecting one of either said complementary carry-one output ($\overline{ci^1}$) or said carry-zero output ($ci^0$) under control of adjacent carry-zero and complementary carry-zero outputs ($c(i-1)^0$ and $\overline{c(i-1)^0}$);

a fourth NMOS pass-transistor multiplexer for selecting one of either said complementary carry-one sum output ($\overline{si^1}$) or said complementary carry-zero sum output ($\overline{si^0}$) under control of adjacent carry-one and complementary carry-one outputs ($c(i-1)^1$ and $\overline{c(i-1)^1}$);

a fifth NMOS pass-transistor multiplexer for selecting one of either said carry-one output ($ci^1$) or said complementary carry-zero output ($\overline{ci^0}$) under control of adjacent carry-one and complementary carry-one outputs ($c(i-1)^1$ and $\overline{c(i-1)^1}$)); and a sixth NMOS pass-transistor multiplexer for selecting one of either said complementary carry-one output ($\overline{ci^1}$) or said carry-zero output ($ci^0$) under control of adjacent carry-one and complementary carry-one outputs ($c(i-1)^1$ and $\overline{c(i-1)^1}$)).

3. The adder of claim 2, wherein a first one of said output multiplexers comprises a transmission gate multiplexer for selecting one of either the complementary carry-one sum output ($\overline{si^1}$) or said complementary carry-zero sum output ($\overline{si^0}$) of a first one of said conditional sum cells under control of said carry input (Cin).

4. The adder of claim 2, wherein each of the 2 to n ones of said output multiplexers comprises a transmission gate multiplexer for selecting one of either the selected one of said complementary carry-one sum output ($\overline{si^1}$) and said complementary carry-zero sum output ($\overline{si^0}$) output from said first NMOS pass-transistor multiplexer of an associated one of said multiplexer blocks or the selected one of said complementary carry-one sum output ($\overline{si^1}$) and said complementary carry-zero sum output ($\overline{si^0}$) output from said fourth NMOS pass-transistor multiplexer of said associated one of said multiplexer blocks under control of said carry input (Cin).

5. The adder of claim 4, further including a single-ended logic level voltage restoration circuit connected to said transmission gate multiplexer.

6. The adder of claim 2, wherein the n+1th output multiplexer comprises a first transmission gate multiplexer for selecting as said carry output (Cout) one of either the selected one of said carry-one output ($ci^1$) and said complementary carry-zero output ($\overline{ci^0}$) output from said second NMOS pass-transistor multiplexer or the selected one of said carry-one output ($ci^1$) and said complementary carry-zero output ($\overline{ci^0}$) output from said fifth NMOS pass-transistor multiplexer of the nth one of said multiplexer blocks, under control of said carry input (Cin), and wherein the n+2nd output multiplexer comprises a second transmission gate multiplexer for selecting as a complement of said carry output ($\overline{Cout}$) one of either the selected one of said complementary carry-one output ($\overline{ci^1}$) and said carry-zero output ($ci^0$) from said third NMOS pass-transistor multiplexer or the selected one of said complementary carry-one output ($\overline{ci^1}$) and said carry-zero output ($ci^0$) from said sixth NMOS pass-transistor multiplexer of the nth one of said multiplexer blocks, under control of said carry input (Cin).

7. The adder of claim 6, further including a double-ended logic level voltage restoration circuit connected intermediate said second, third, fifth and sixth NMOS pass-transistor multiplexers and said n+1th and n+2nd output multiplexers.

* * * * *